United States Patent
Yoshikawa

(10) Patent No.: US 10,715,710 B2
(45) Date of Patent: Jul. 14, 2020

(54) CAMERA MODULE, IMAGING APPARATUS, AND VEHICLE

(71) Applicant: KYOCERA Corporation, Kyoto (JP)

(72) Inventor: Atsushi Yoshikawa, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/329,337

(22) PCT Filed: Aug. 21, 2017

(86) PCT No.: PCT/JP2017/029745
§ 371 (c)(1),
(2) Date: Feb. 28, 2019

(87) PCT Pub. No.: WO2018/043172
PCT Pub. Date: Mar. 8, 2018

(65) Prior Publication Data
US 2019/0222729 A1      Jul. 18, 2019

(30) Foreign Application Priority Data

Aug. 29, 2016 (JP) .................................. 2016-167418

(51) Int. Cl.
*H04N 5/225* (2006.01)
*G03B 17/02* (2006.01)
*G02B 7/02* (2006.01)

(52) U.S. Cl.
CPC ............. *H04N 5/2254* (2013.01); *G02B 7/02* (2013.01); *G03B 17/02* (2013.01); *H04N 5/225* (2013.01)

(58) Field of Classification Search
CPC .................................................. H04N 5/2253
See application file for complete search history.

(56) References Cited

U.S. PATENT DOCUMENTS

| 8,035,495 | B2 * | 10/2011 | Oh ............................ B60R 1/00 340/425.5 |
| 8,587,882 | B2 * | 11/2013 | Wippermann ......... G02B 7/028 359/811 |
| 2008/0297645 | A1 | 12/2008 | Lo et al. |
| 2009/0079863 | A1 * | 3/2009 | Aoki .................... G02B 13/001 348/374 |
| 2012/0162795 | A1 | 6/2012 | Yoshimura |

FOREIGN PATENT DOCUMENTS

| JP | 2005236754 A | * | 9/2005 |
| JP | 2007-110594 A |   | 4/2007 |
| JP | 2008-028838 A |   | 2/2008 |
| KR | 20080037783 A |   | 5/2008 |

* cited by examiner

*Primary Examiner* — Clayton E. LaBalle
*Assistant Examiner* — Leon W Rhodes, Jr.
(74) *Attorney, Agent, or Firm* — Studebaker & Brackett PC

(57) ABSTRACT

A camera module includes a lens unit, a holding member, and a fixing member. The lens unit includes a lens for causing light to enter an internal space. The holding member holds an image sensor for capturing an image formed by the light. The fixing member fixes the lens unit and the holding member. The fixing member is cured resin. The lens unit further includes a groove at least partially housing the fixing member, and having an opening which faces the holding member. In a state such that the lens unit and the holding member are fixed to the fixing member, more of the fixing member is exposed to the outside of the lens unit than to the internal space surrounded by the lens unit and the holding member.

7 Claims, 9 Drawing Sheets

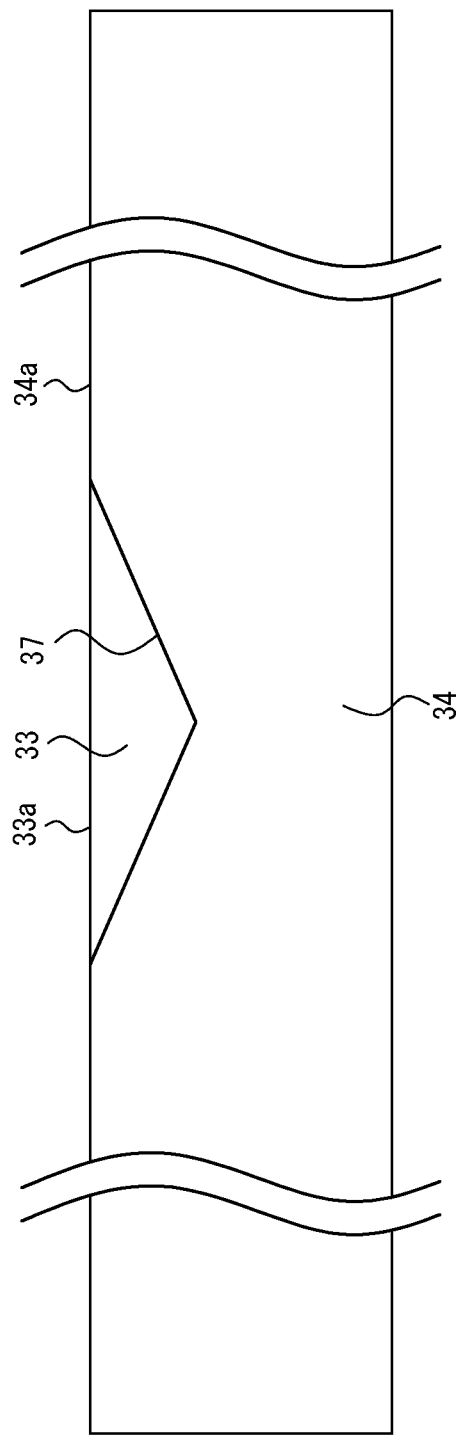

CAMERA MODULE, IMAGING APPARATUS, AND VEHICLE

CROSS-REFERENCE TO RELATED APPLICATION

The present application claims priority to and the benefit of Japanese Patent Application No. 2016-167418 filed Aug. 29, 2016, the entire contents of which are incorporated herein by reference.

TECHNICAL FIELD

The present disclosure relates to a camera module, an imaging apparatus, and a vehicle.

BACKGROUND

In a known camera module, a lens unit including a lens and a holding member holding an image sensor are fixed together using screws after positioning the lens and the image sensor. When the screws are tightened for fixing in this case, an external force due to rotation of the screws and sinking of members and the like acts on the lens unit or the holding member and may reduce the accuracy of the positional relationship between the lens and the image sensor.

SUMMARY

Solution to Problem

A camera module of the present disclosure includes a lens unit, a holding member, and a fixing member. The lens unit includes a lens for causing light to enter an internal space. The holding member holds an image sensor for capturing an image formed by the light. The fixing member fixes the lens unit and the holding member. The fixing member is cured resin. The lens unit further includes a groove at least partially housing the fixing member, and having an opening which faces the holding member such that when the lens unit and the holding member are fixed by the fixing member, more of the fixing member is exposed to the outside of the lens unit than to an internal space surrounded by the lens unit and the holding member.

An imaging apparatus of the present disclosure includes a camera module. The camera module includes a lens unit, a holding member, and a fixing member. The lens unit includes a lens for causing light to enter an internal space. The holding member holds an image sensor for capturing an image formed by the light. The fixing member fixes the lens unit and the holding member. The fixing member is cured resin. The lens unit includes a groove at least partially housing the fixing member, and having an opening which faces the holding member such that when the lens unit and the holding member are fixed by the fixing member, more of the fixing member is exposed to the outside of the lens unit than to the internal space surrounded by the lens unit and the holding member.

A vehicle of the present disclosure includes an imaging apparatus. The imaging apparatus includes a camera module. The camera module includes a lens unit, a holding member, and a fixing member. The lens unit includes a lens for causing light to enter an internal space. The holding member holds an image sensor for capturing an image formed by the light. The fixing member fixes the lens unit and the holding member. The fixing member is cured resin. The lens unit includes a groove at least partially housing the fixing member, and having an opening which faces the holding member such that when the lens unit and the holding member are fixed by the fixing member, more of the fixing member is exposed to the outside of the lens unit than to the internal space surrounded by the lens unit and the holding member.

BRIEF DESCRIPTION OF THE DRAWINGS

In the accompanying drawings:

FIG. 9B is a view of FIG. 9A from the outer wall side; and

DETAILED DESCRIPTION

Figure 1:
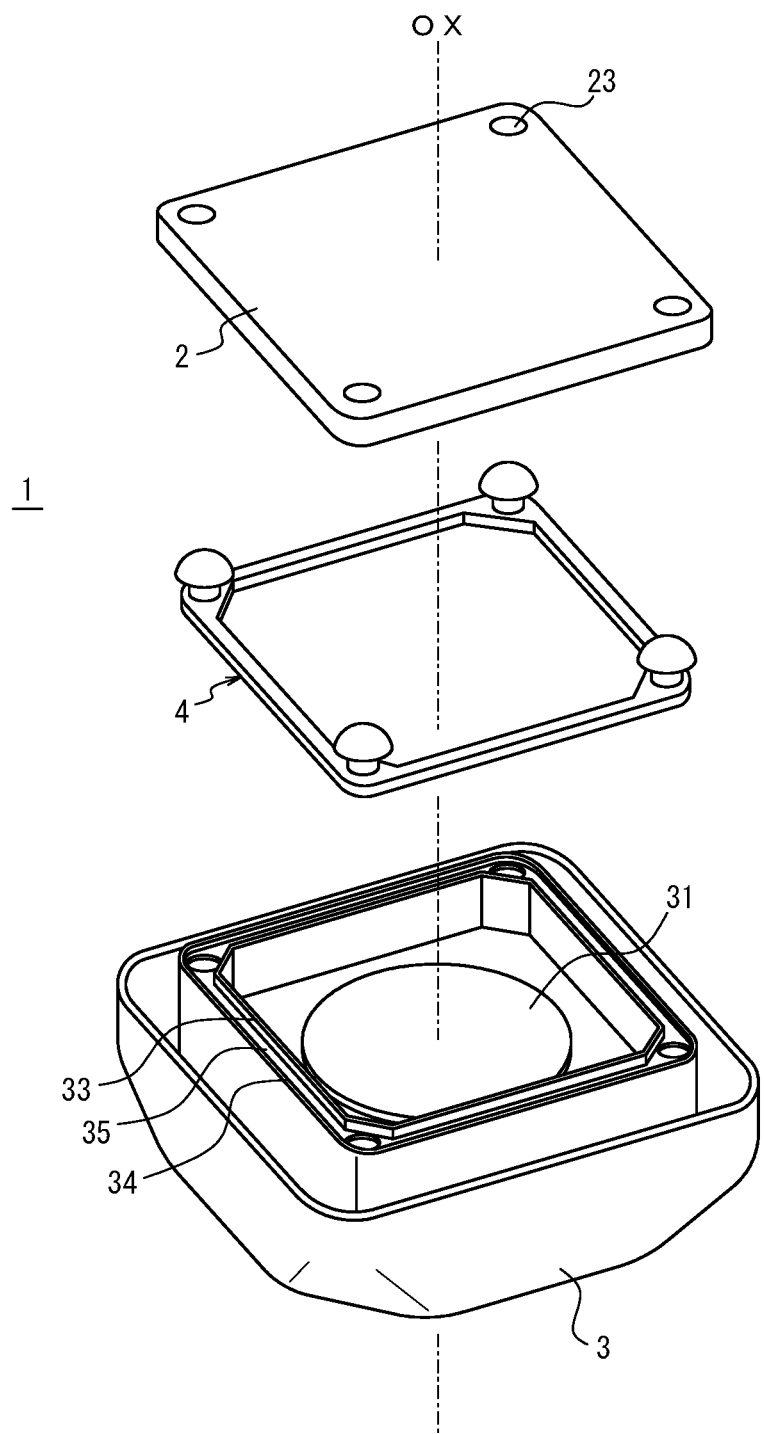
FIG. 1 is an exploded perspective view of a camera module according to the present embodiment.

When the lens unit and the holding member are adhered via a fixing member, the fixing member sometimes projects out from between the lens unit and the holding member when the position of the image sensor held by the holding member is adjusted with respect to the lens in the lens unit. The projecting fixing member may cause problems in the camera module. For example, if the fixing member projects out and attaches to the image sensor, defects occur in captured images. Furthermore, if the fixing member projects out, attaches to circuit elements held by the holding member, and then expands, the circuit elements may detach from the holding member.

In light of these points, the present disclosure provides a camera module, an imaging apparatus, and a vehicle that can prevent a fixing member for fixing a lens unit and a holding member together from causing problems.

An embodiment of the present disclosure can prevent a fixing member for fixing a lens unit and a holding member together from attaching to an image sensor, a circuit element, or the like and causing problems in a camera module.

Various embodiments are described below in detail with reference to the drawings. The drawings referred to below are schematic illustrations, and the dimensional ratios and the like in the drawings do not necessarily match the actual dimensions.

Figure 2:
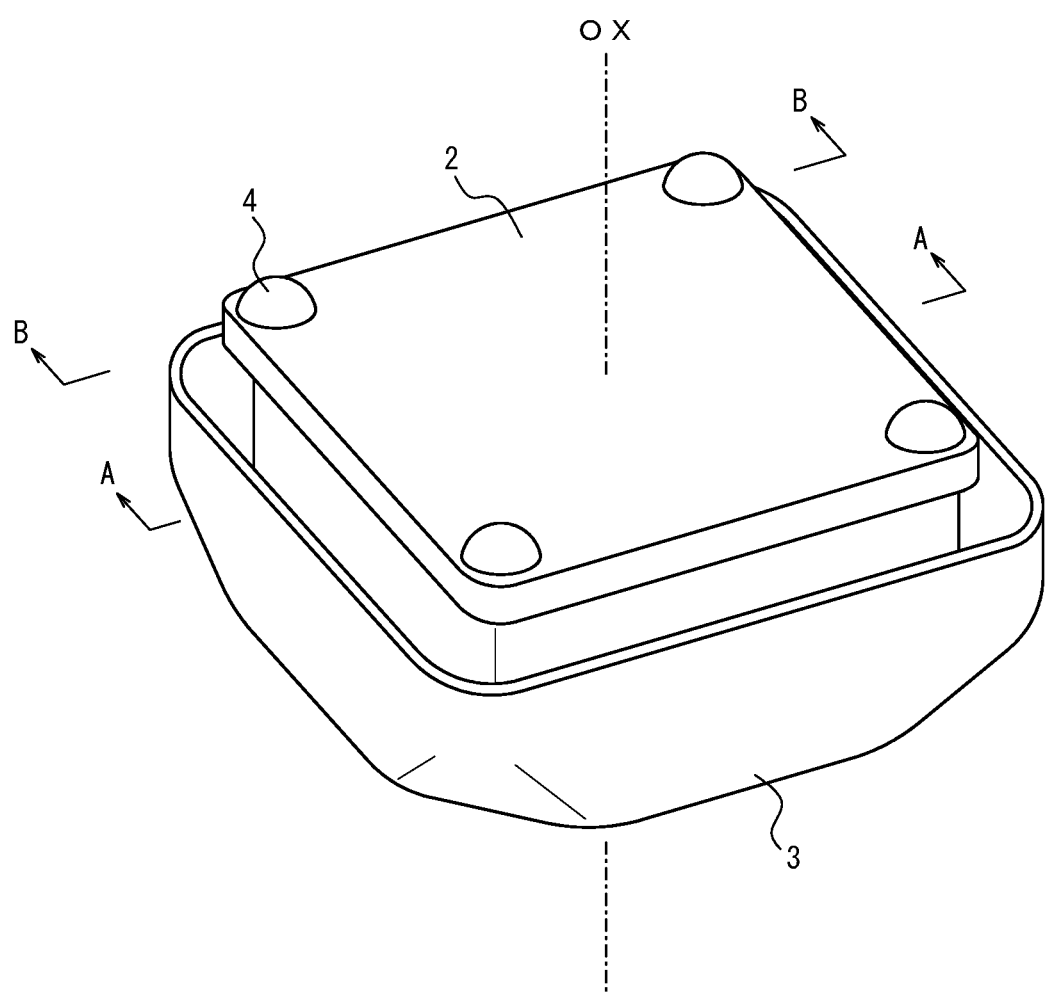
FIG. 2 is a perspective view of the camera module according to the present embodiment.
Figure 3:
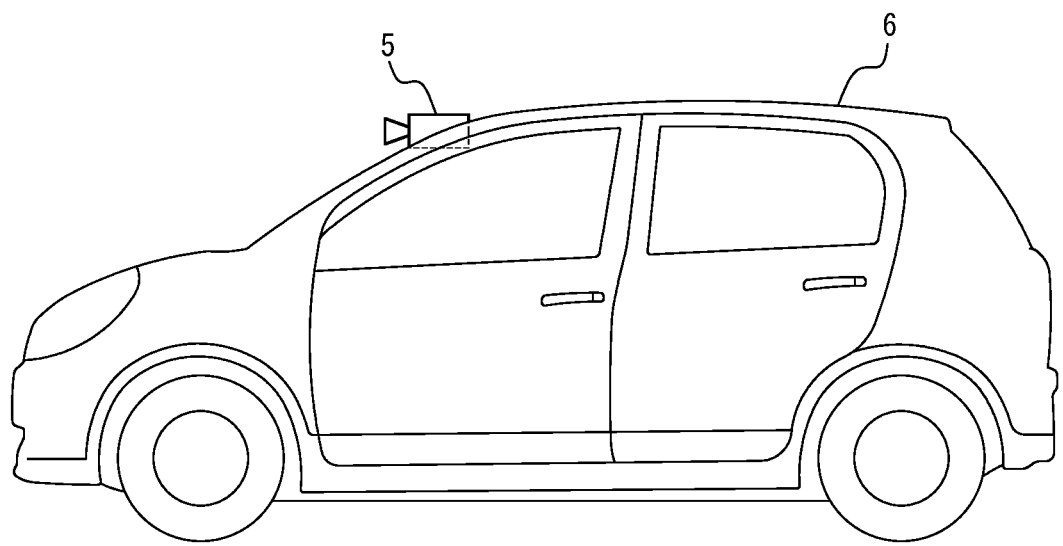
FIG. 3 schematically illustrates a vehicle in which an imaging apparatus, provided with the camera module in FIG. 1, is mounted.

As illustrated in FIG. 1, a camera module 1 includes a holding member 2, a lens unit 3, and a fixing member 4 made by curing an adhesive or the like. The lens unit 3 includes a lens 31. The lens 31 is fixed to the lens unit 3. When the camera module 1 is in an assembled state, the holding member 2 and the lens unit 3 are fixed together, as illustrated in FIG. 2. The camera module 1 is included in an imaging apparatus 5, such as the one illustrated in FIG. 3. The imaging apparatus 5 is mounted in a vehicle 6. The imaging apparatus 5 mounted in the vehicle 6 captures images of the area ahead of the vehicle 6, for example. The imaging direction of the imaging apparatus 5 is not limited to being ahead of the vehicle 6. The imaging apparatus 5 may capture images to the sides of or behind the vehicle 6 or may capture images of the inside of the vehicle 6.

The fixing member 4 may be, but is not limited to, a resin such as epoxy, for example. The fixing member 4 may be, but is not limited to, a cured resin such as a photocurable resin cured by irradiation with light (for example, ultraviolet (UV) light) or a thermosetting resin cured by application of heat. For example, the fixing member 4 may be a UV and thermosetting fixing member cured by UV irradiation and heat.

Figure 4:
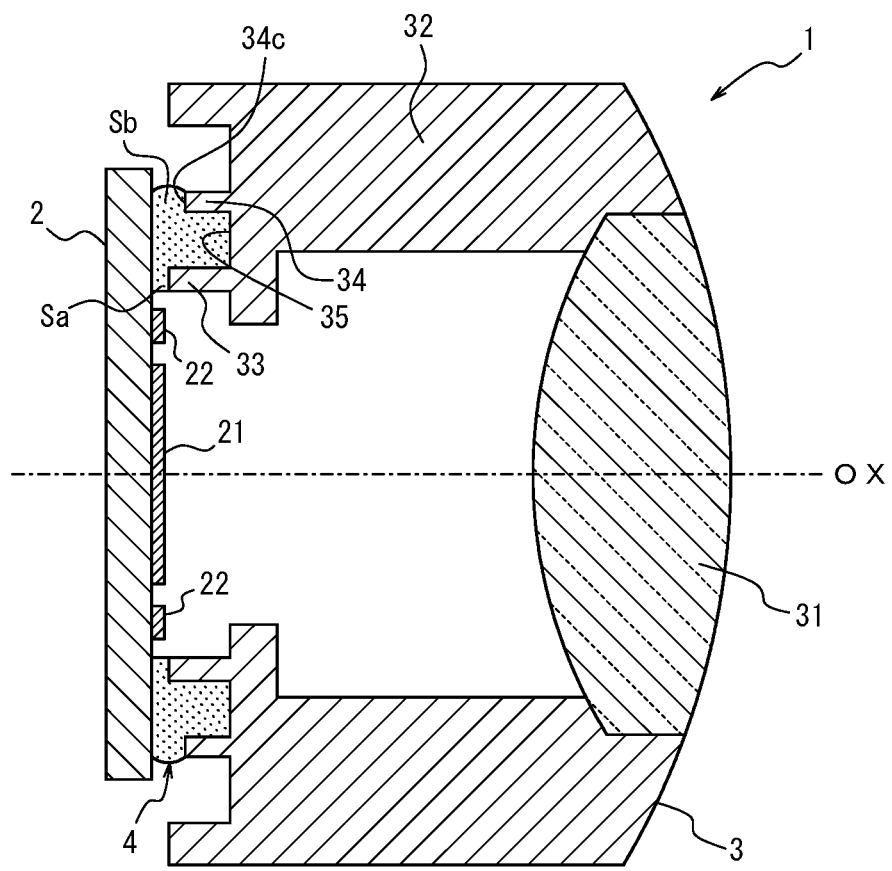
FIG. 4 is a cross-section of the camera module in FIG. 2 along the A-A line.

As illustrated in FIG. 4, the holding member 2 is a member that fixes and holds an image sensor 21 and circuit elements 22 such as resistors, capacitors, and transistors. The image sensor 21 captures an image formed by light entering the internal space of the lens unit 3. The image sensor 21 is fixed at the position, in the holding member 2, at which light passing through the lens 31 of the lens unit 3 forms an image. The position in the holding member 2 at which light forms an image is further inward than the position where the holding member 2 is joined to the lens unit 3, i.e. further inward than the position in the holding member 2 where the fixing member 4 is disposed. The circuit elements 22 are fixed at positions on the holding member 2 where the image sensor 21 is not disposed, further inward than the position where the holding member 2 is joined to the lens unit 3.

As illustrated in FIG. 1, one or more filling holes 23 are provided in the holding member 2. The filling holes 23 are provided to be opposite a portion of a groove 35, described below, when the holding member 2 is in a state of being fixed to the lens unit 3. Four filling holes 23 are provided in the example in FIG. 1. The number of filling holes 23 is not, however, limited to four.

As illustrated in FIG. 4, the lens unit 3 includes the lens 31 for causing light to enter the internal space and a lens barrel 32 that is open along an optical axis OX of the lens 31. An inner wall 33, which is a first wall, and an outer wall 34, which is a second wall, are formed in the lens barrel 32. The groove 35 is formed in the lens barrel 32 by the surface of the inner wall 33 facing the outer wall 34, the surface of the outer wall 34 facing the inner wall 33, and the surface connecting these two surfaces.

The lens 31 focuses incident light to form an image on the image sensor 21. The lens 31 may, for example, be a fisheye lens or an ultra-wide angle lens. The lens 31 may be configured by a single lens or a plurality of lenses.

The opening of the lens barrel 32 is the portion through which external light entering the lens 31 passes to reach the image sensor 21. One or more other lenses forming an optical system along with the lens 31, or optical members such as various filters, can be arranged in the opening.

The inner wall 33 is disposed in the lens unit 3 on the outside of the opening and protrudes towards the holding member 2. In other words, the inner wall 33 can have a surface parallel to the direction of the optical axis OX. The orientation of the surface of the inner wall 33 is not limited to this example and may be inclined relative to the optical axis OX. The outer wall 34 is disposed on the opposite side of the inner wall 33 from the optical axis OX and protrudes towards the holding member 2. In other words, the outer wall 34 can have a surface parallel to the direction of the optical axis OX. The orientation of the surface of the outer wall 34 is not limited to this example and may be inclined relative to the optical axis OX.

The inner wall 33 and the outer wall 34 are provided so that the region sandwiched between the holding member 2 and the groove 35 opens more widely to the outside of the lens unit 3 (external space) than to the internal space that includes the optical axis OX of the lens 31.

Specifically, a gap Sb between the outer wall 34 and the holding member 2 is larger than a gap Sa between the outer wall 34 and the holding member 2. In one example, the length of at least a portion of the outer wall 34 in the direction along the optical axis OX is shorter than the length of the inner wall 33 in the direction along the optical axis OX. Consequently, when the surface of the holding member 2 facing the outer wall 34 and the inner wall 33 is flat, the gap Sb between the outer wall 34 and the holding member 2 is larger than the gap Sa between the inner wall 33 and the holding member 2.

The groove 35 at least partially houses the fixing member 4. The opening of the groove 35 is oriented towards the holding member 2. As illustrated in FIG. 1, the groove 35 may be disposed to surround the outer periphery of the image sensor 21.

The fixing member 4 is adhesive or the like that fixes the lens unit 3 and the holding member 2 together. When the holding member 2 and the lens unit 3 are to be joined, the uncured fixing member 4 is filled into the groove 35 and is applied so as to accumulate on the edge 33a of the inner wall 33 and the edge 34a of the outer wall 34. After positioning the lens 31 and the image sensor 21 to be in a state of alignment with each other, the uncured fixing member 4 is then filled into the filling holes 23 and is applied on the holding member 2 to accumulate around the filling holes 23 at the opposite side from the side facing the lens unit 3. In a state such that the lens unit 3 and the holding member 2 are fixed, more of the fixing member 4 is exposed to the outside of the lens unit 3 than to the internal space surrounded by the lens unit 3 and the holding member 2.

Here, the "state of alignment" between the lens 31 and the image sensor 21 is a state in which the lens 31 and the image sensor 21 have been aligned in each of the optical axis OX direction of the lens 31, a direction orthogonal to the optical axis OX, and a rotation direction around the direction orthogonal to the optical axis OX.

Figure 5:
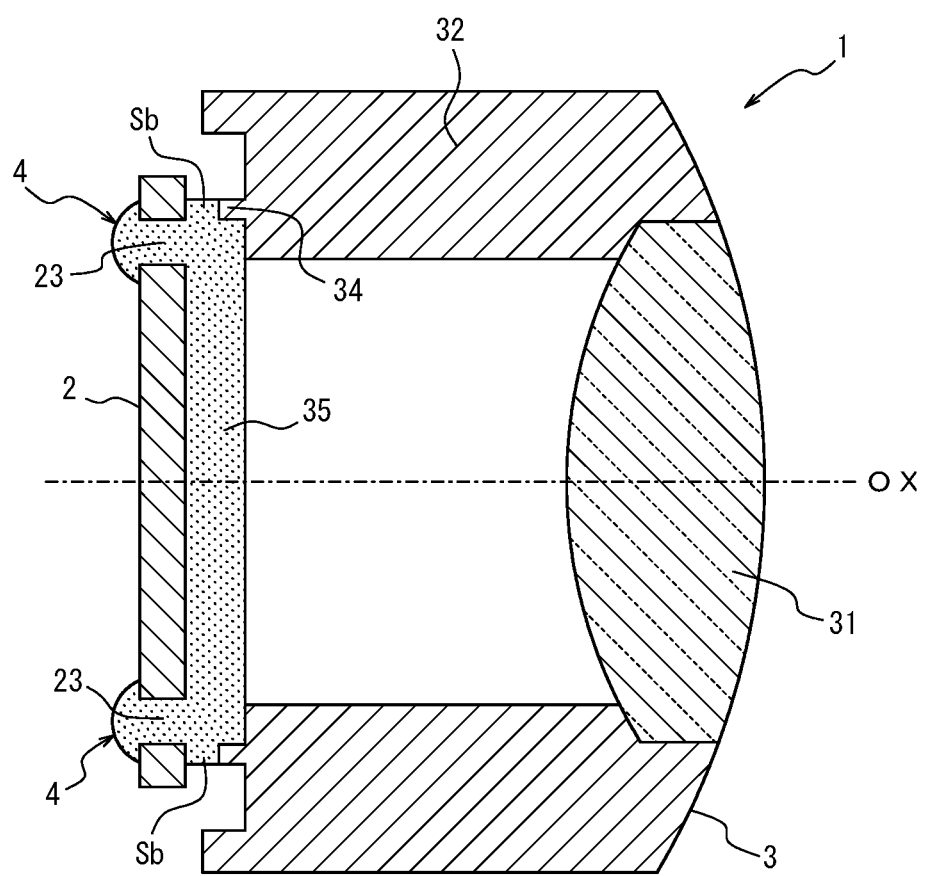
FIG. 5 is a cross-section of the camera module in FIG. 2 along the B-B line.

When the uncured fixing member 4 that has been filled and applied in this way is cured, the fixing member 4 joins to the lens unit 3 and the holding member 2 while in a state of being housed in the groove 35 and disposed on the edge 33a of the inner wall 33 and the edge 34a of the outer wall 34, as illustrated in FIG. 4. Furthermore, the fixing member 4 is fitted with the holding member 2 in a state of being disposed around the filling holes 23, as illustrated in FIG. 5. Here, "fitted" refers to two or more members fitting together to become integrated and restrict each other's movement. Accordingly, the holding member 2 and the lens unit are fixed together via the fixing member 4.

When the groove 35 is disposed to surround the outer periphery of the image sensor 21 as described above, the fixing member 4 forms a peripheral seal between the lens unit 3 and the holding member 2 along the groove 35.

Figure 6A:
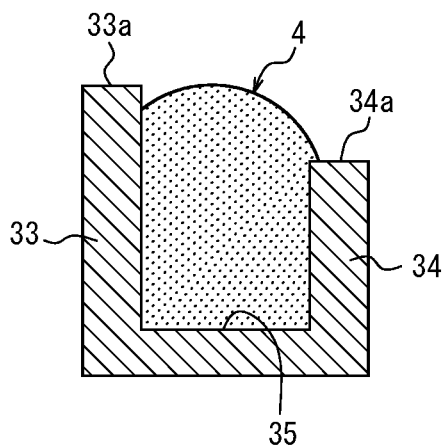
FIG. 6A illustrates a state in which a fixing member is filled in a groove.
Figure 6B:
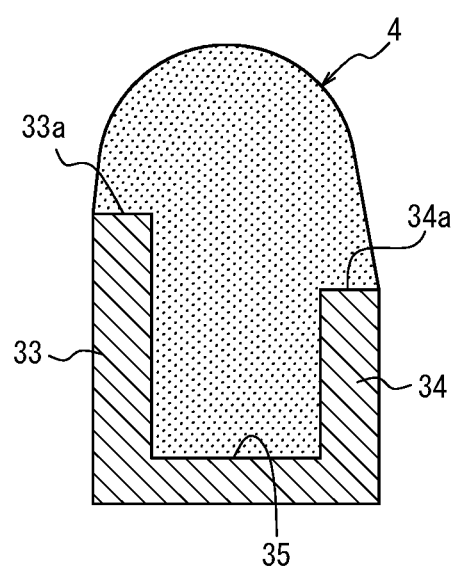
FIG. 6B illustrates a state in which an fixing member is applied to the groove so as to accumulate on the edge of the wall.
Figure 6C:
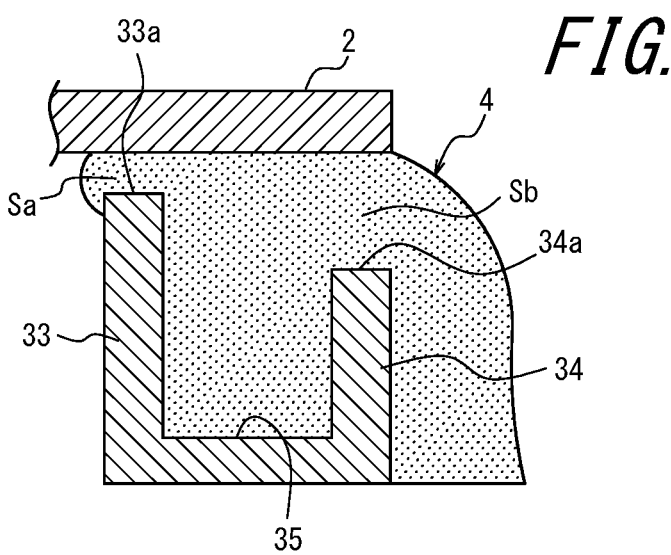
FIG. 6C illustrates a state in which a holding member is aligned after the state in FIG. 6B.

The filling and application of the fixing member 4 when fixing the holding member 2 to the lens unit 3 are now described in greater detail. First, as illustrated in FIG. 6A, the uncured fixing member 4 is filled into the groove 35. Once the fixing member 4 is filled into the groove 35, the uncured fixing member 4 is applied so as to accumulate on the edge 33a of the inner wall 33 and the edge 34a of the outer wall 34, as illustrated in FIG. 6B. In this state, the lens 31 and the image sensor 21 are aligned, and the holding member 2 is aligned with the lens unit 3, as illustrated in FIG. 6C. A portion of the uncured fixing member 4 that had accumulated on the edges 33a and 34a is extruded at this time to the outside of the outer wall 34 through the gap Sb between the outer wall 34 and the holding member 2. The gap Sb is larger than the gap Sa. Consequently, most of the uncured fixing member 4 is extruded to the external space through the gap Sb. The amount of uncured fixing member 4 that is extruded to the internal space through the gap Sa is less than when the gap Sa and the gap Sb are the same size.

In this way, even if the uncured fixing member 4 projects out from between the lens unit 3 and the holding member 2 when the position of the holding member 2 is adjusted relative to the lens 31 of the lens unit 3, the above embodiment can reduce problems caused by the projecting fixing member 4. Specifically, most of the fixing member 4 projects to the outside of the groove 35 by passing not through the gap Sa, but rather through the larger gap Sb. Consequently, little of the fixing member 4 projects to the inside of the groove 35, which can reduce attachment of the fixing member 4 to the image sensor 21 or to the circuit elements 22 held by the holding member 2. Problems in the camera module 1 due to the fixing member 4 can therefore be reduced.

In the present embodiment, the inner wall 33, the outer wall 34, and the groove 35 are disposed to surround the outer periphery of the opening, i.e. to form a closed curve when viewed from the optical axis OX direction. The fixing member 4 is disposed between (i) the inside of the groove 35, the edge 33a of the inner wall 33, and the edge 34a of the outer wall 34 and (ii) the holding member 2. The likelihood of dirt, dust, or the like entering the internal space from outside the lens unit 3 can therefore be reduced. Accordingly, the attachment of dirt, dust, or the like to the image sensor 21, the circuit elements 22, the lens 31, and the like can be reduced, allowing a reduction in problems in the camera module 1.

Since the lens unit 3 and the holding member 2 are joined and fit to the fixing member 4 in the present embodiment, the lens unit 3 and the holding member 2 can prevent each other from moving in the optical axis OX direction and from moving in the rotation direction around the direction orthogonal to the optical axis OX. Therefore, the distance between the lens 31 and the image sensor 21 is maintained, and the state of alignment in the optical axis OX direction and the rotation direction around the direction orthogonal to the optical axis OX is maintained. Furthermore, movement in the direction orthogonal to the optical axis OX direction and movement in the rotation direction around the optical axis OX direction can be prevented. The state of alignment in the direction orthogonal to the optical axis OX direction and the rotation direction around the optical axis OX direction can therefore be maintained.

The lens unit 3 and the holding member 2 in the present embodiment are aligned and then fixed by photocuring and/or thermally curing the fixing member 4. Misalignment due to an external force can therefore be prevented. Furthermore, members such as screws need not be used, allowing a high degree of freedom for designs without space for such members.

The above embodiments and examples have been described as representative examples, but it will be apparent to one of ordinary skill in the art that numerous modifications and replacements may be made within the spirit and scope of the present disclosure. Therefore, the present disclosure should not be interpreted as being restricted to the above embodiments and examples. A variety of changes or modifications may be made without departing from the scope of the appended claims.

Figure 7:
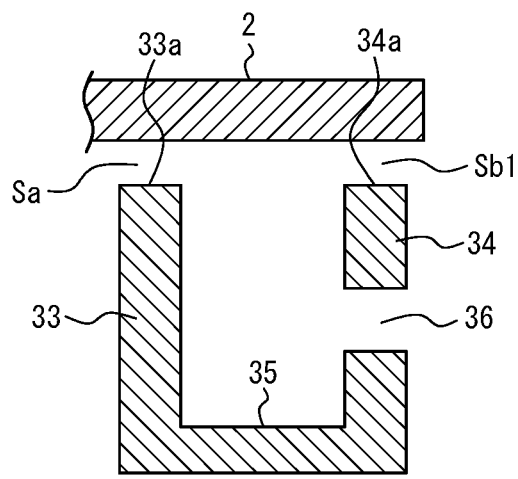
FIG. 7 is an enlarged cross-section of a portion that joins to a holding member in a lens unit according to a first modification.

In the above embodiment, the length of at least a portion of the outer wall 34 in the direction along the optical axis OX is shorter than the length of the inner wall 33 in the direction along the optical axis OX, but this example is not limiting. For example, the outer wall 34 may include a through-hole 36 penetrating to the external space, as illustrated in FIG. 7. The size, shape, and number of through-holes 36 may be chosen freely. In this case, the through-hole 36 and the gap Sb1 between the outer wall 34 and the holding member 2 are the portion that opens to the external space in the region sandwiched between the holding member 2 and the groove 35. In this way, less of the fixing member 4 projects into the internal space of the groove 35 than into the external space. Attachment or the like of the projecting fixing member 4 to the image sensor 21 or to the circuit elements 22 held by the holding member 2 can therefore be reduced.

Figure 8:
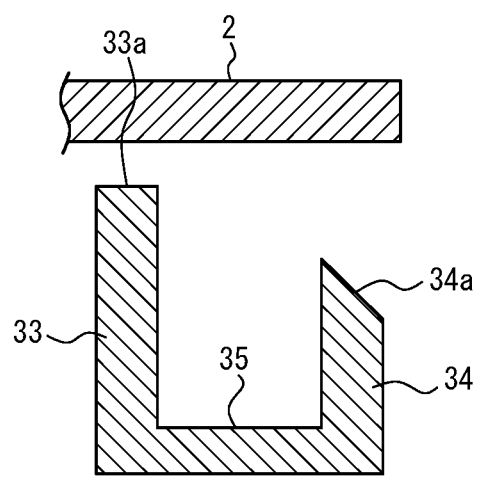
FIG. 8 is an enlarged cross-section of a portion that joins to a holding member in a lens unit according to a second modification.

The edge 34a of the outer wall 34 in the above embodiment is illustrated in FIGS. 6A, 6B, and 6C as a surface substantially perpendicular to the optical axis OX, but this configuration is not limiting. For example, as illustrated in FIG. 8, the edge 34a may have a tapered shape inclined to separate from the holding member 2 with increased distance from the optical axis OX. In this case, the fixing member 4 projects out along the tapered surface when the holding member 2 is aligned with the lens unit 3. Consequently, more of the projecting fixing member 4 projects outside of the outer wall 34 than in the above embodiment. Even less of the fixing member 4 therefore passes through the gap Sa and projects into the internal space of the lens unit 3. Accordingly, little of the fixing member 4 projects into the groove 35, and attachment to the image sensor 21, the circuit elements 22, and the like can be even further reduced.

Figure 9A:
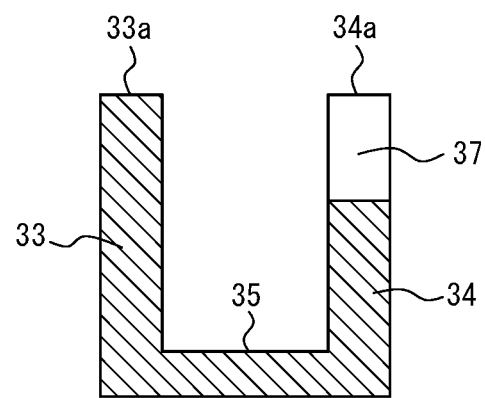
FIG. 9A is an enlarged cross-section of a portion that joins to a holding member in a lens unit.

In the above embodiment, the length of at least a portion of the outer wall 34 in the direction along the optical axis OX is set to be shorter than the length of the inner wall 33 in the direction along the optical axis OX, but this example is not limiting. For example, the length of at least a portion of the outer wall 34 in the direction along the optical axis OX may be substantially equal to the length of the inner wall 33 in the direction along the optical axis OX, as illustrated in FIG. 9A. The outer wall 34 may include a notch 37, as illustrated in FIG. 9B. The fixing member 4 passes through the notch 37 when the holding member 2 is aligned with the lens unit 3. Consequently, more of the projecting fixing member 4 projects outside of the outer wall 34 than in the above embodiment. Even less of the fixing member 4 therefore projects into the internal space of the lens unit 3. Hence, attachment to the image sensor 21, the circuit elements, and the like can be even further reduced. In this example, the length of at least a portion of the outer wall 34 in the direction along the optical axis OX may be shorter than the length of the inner wall 33 in the direction along the optical axis OX.

Figure 10:
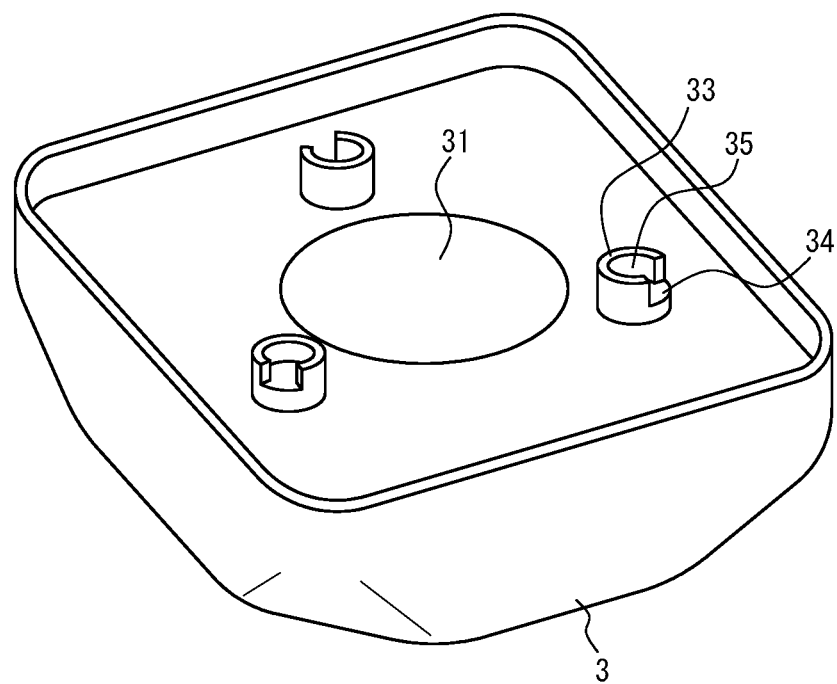
FIG. 10 is a perspective view of a lens unit according to a fourth modification.

In the above embodiment, the groove 35 is disposed to surround the outer periphery of the opening, as illustrated in FIG. 1. This configuration is not limiting, however. The inner wall 33, the outer wall 34, and the groove 35 may be provided in at least a portion of the outer side of the opening, as illustrated in FIG. 10. In this case, the amount of material for forming the inner wall 33 and the outer wall 34 can be reduced, thereby reducing costs and achieving a lightweight camera module 1.

One or more filling holes 23 are provided in the holding member 2 in the above embodiment, but this configuration is not limiting. In other words, the filling holes 23 need not be provided in the holding member 2. In this case, the fixing member 4 joins to the lens unit 3 and the holding member 2 while in a state of being housed in the groove 35 and disposed on the edge 33a of the inner wall 33 and the edge 34a of the outer wall 34, thereby fixing the lens unit 3 and the holding member 2 together. The fixing member 4 in this case does not fit together with the holding member 2, but the uncured fixing member 4 need not be applied inside and around the filling holes 23, thereby simplifying the process for assembling the camera module 1.

REFERENCE SIGNS LIST

1 Camera module
2 Holding member
3 Lens unit
4 Fixing member
5 Imaging apparatus
6 Vehicle
21 Image sensor
22 Circuit element
23 Filling hole
31 Lens
32 Lens barrel
33 Inner wall
34 Outer wall
33a, 34a Edge
35 Groove
36 Through-hole
37 Notch

The invention claimed is:

1. A camera module comprising:
a lens unit including a lens;
a holding member configured to hold an image sensor for capturing an image formed by light; and
a fixing member made of cured resin and configured to fix the lens unit and the holding member; wherein
the lens unit further includes
a groove at least partially housing the fixing member, and having an opening which faces the holding member, such that when the lens unit and the holding member are fixed by the fixing member, more of the fixing member is exposed to an outside of the lens unit than to an internal space surrounded by the lens unit and the holding member; and
a first wall on the internal space side of the groove and a second wall on an external space side of the groove, and a length of at least a portion of the second wall in an optical axis direction is shorter than a length of the first wall in the optical axis direction, and
an edge of the second wall on the holding member side has a tapered shape inclined to separate from the holding member with increased distance from the optical axis.

2. The camera module of claim 1, wherein the groove includes a through-hole penetrating to an external space.

3. The camera module of claim 1, wherein the groove is disposed to surround an outer periphery of the image sensor, and the fixing member forms a peripheral seal between the lens unit and the holding member along the groove.

4. The camera module of claim 2, wherein the groove is disposed to surround an outer periphery of the image sensor, and the fixing member forms a peripheral seal between the lens unit and the holding member along the groove.

5. The camera module of claim 1, wherein the holding member includes at least one filling hole located in a portion of the holding member that faces the groove.

6. An imaging apparatus comprising:
a camera module; wherein
the camera module comprises:
a lens unit including a lens configured to cause light to enter an internal space;
a holding member configured to hold an image sensor for capturing an image formed by the light; and
a fixing member made of cured resin and configured to fix the lens unit and the holding member;
the lens unit includes
a groove at least partially housing the fixing member, and having an opening which faces the holding member, such that when the lens unit and the holding member are fixed by the fixing member, more of the fixing member is exposed to an outside of the lens unit than to the internal space surrounded by the lens unit and the holding member; and
a first wall on the internal space side of the groove and a second wall on an external space side of the groove, and a length of at least a portion of the second wall in an optical axis direction is shorter than a length of the first wall in the optical axis direction, and
an edge of the second wall on the holding member side has a tapered shape inclined to separate from the holding member with increased distance from the optical axis.

7. A vehicle comprising:
an imaging apparatus comprising a camera module; wherein
the camera module comprises:
a lens unit including a lens configured to cause light to enter an internal space;
a holding member configured to hold an image sensor for capturing an image formed by the light; and
a fixing member made of cured resin and configured to fix the lens unit and the holding member;
the lens unit includes
a groove at least partially housing the fixing member, and having an opening which faces the holding member, such that when the lens unit and the holding member are fixed by the fixing member, more of the fixing member is exposed to an outside of the lens unit than to the internal space surrounded by the lens unit and the holding member; and
a first wall on the internal space side of the groove and a second wall on an external space side of the groove, and a length of at least a portion of the second wall in an optical axis direction is shorter than a length of the first wall in the optical axis direction, and an edge of the second wall on the holding member side has a tapered shape inclined to separate from the holding member with increased distance from the optical axis.

* * * * *